United States Patent
Biskeborn et al.

(10) Patent No.: US 10,388,308 B2
(45) Date of Patent: *Aug. 20, 2019

(54) TUNNEL MAGNETORESISTIVE SENSOR HAVING LEADS SUPPORTING THREE DIMENSIONAL CURRENT FLOW

(71) Applicant: International Business Machines Corporation, Armonk, NY (US)

(72) Inventors: Robert G. Biskeborn, Hollister, CA (US); Robert E. Fontana, Jr., San Jose, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,335

(22) Filed: Feb. 1, 2018

(65) Prior Publication Data

US 2018/0247665 A1    Aug. 30, 2018

Related U.S. Application Data

(63) Continuation of application No. 15/445,861, filed on Feb. 28, 2017, now Pat. No. 9,947,348.

(51) Int. Cl.
*G11B 5/39* (2006.01)

(52) U.S. Cl.
CPC ............ *G11B 5/3912* (2013.01); *G11B 5/398* (2013.01); *G11B 5/3929* (2013.01)

(58) Field of Classification Search
None
See application file for complete search history.

(56) References Cited

U.S. PATENT DOCUMENTS

| | | |
|---|---|---|
| 5,668,686 A | 9/1997 | Shouji et al. |
| 5,668,688 A | 9/1997 | Dykes et al. |
| 5,862,022 A | 1/1999 | Noguchi et al. |
| 5,880,910 A | 3/1999 | Shouji et al. |

(Continued)

FOREIGN PATENT DOCUMENTS

| | | |
|---|---|---|
| EP | 0911811 A2 | 4/1999 |
| EP | 2320489 B1 | 5/2014 |
| JP | 2006134388 A | 5/2006 |

OTHER PUBLICATIONS

Supplemental Notice of Allowance from U.S. Appl. No. 15/812,871, dated Apr. 25, 2018.

(Continued)

*Primary Examiner* — William J Klimowicz
(74) *Attorney, Agent, or Firm* — Zilka-Kotab, P.C.

(57) ABSTRACT

An apparatus, according to one embodiment, includes: a transducer structure having: a lower shield, an upper shield above the lower shield, a current-perpendicular-to-plane sensor between the upper and lower shields, an electrical lead layer between the sensor and one of the shields, and a spacer layer between the electrical lead layer and the one of the shields. The upper and lower shields provide magnetic shielding. The electrical lead layer is in electrical communication with the sensor. A conductivity of the electrical lead layer is higher than a conductivity of the spacer layer. A width of the electrical lead layer in a cross-track direction is greater than the width of a free layer of the sensor.

15 Claims, 15 Drawing Sheets

(56) References Cited

U.S. PATENT DOCUMENTS

| | | | |
|---|---|---|---|
| 5,898,547 A | 4/1999 | Fontana, Jr. et al. | |
| 5,898,548 A | 4/1999 | Dill et al. | |
| 6,185,080 B1 | 2/2001 | Gill | |
| 6,198,609 B1 | 3/2001 | Barr et al. | |
| 6,209,193 B1 | 4/2001 | Hsiao | |
| 6,353,518 B2 | 3/2002 | Pinarbasi | |
| 6,680,832 B2 | 1/2004 | Fontana, Jr. et al. | |
| 6,729,014 B2 | 5/2004 | Lin et al. | |
| 6,735,059 B2 | 5/2004 | Sato | |
| 6,762,912 B2 | 7/2004 | Ma | |
| 6,833,979 B1 | 12/2004 | Knapp et al. | |
| 6,847,509 B2 | 1/2005 | Yoshikawa et al. | |
| 6,980,403 B2 | 12/2005 | Hasegawa | |
| 7,031,119 B2 | 4/2006 | Watanabe et al. | |
| 7,057,864 B2 | 6/2006 | Gill | |
| 7,280,321 B2 | 10/2007 | Watanabe et al. | |
| 7,352,539 B2 | 4/2008 | Sato et al. | |
| 7,382,589 B2 | 6/2008 | Lin et al. | |
| 7,551,409 B2 | 6/2009 | Carey et al. | |
| 7,601,610 B2 | 10/2009 | Arena et al. | |
| 7,715,156 B2 | 5/2010 | Hirata et al. | |
| 7,933,100 B2 | 4/2011 | Nakabayashi et al. | |
| 8,081,398 B2 | 12/2011 | Hachisuka | |
| 8,335,056 B2 | 12/2012 | Balamane et al. | |
| 8,576,518 B1 | 11/2013 | Zeltser et al. | |
| 8,804,287 B2 | 8/2014 | Araki et al. | |
| 9,263,068 B1 | 2/2016 | Biskeborn et al. | |
| 9,607,635 B1* | 3/2017 | Biskeborn | G11B 5/3912 |
| 9,747,931 B1* | 8/2017 | Biskeborn | G11B 5/3909 |
| 9,892,747 B2* | 2/2018 | Biskeborn | G11B 5/3912 |
| 9,947,348 B1* | 4/2018 | Biskeborn | G11B 5/3912 |
| 9,997,180 B1* | 6/2018 | Biskeborn | G11B 5/3912 |
| 10,014,015 B2* | 7/2018 | Biskeborn | G11B 5/3912 |
| 2002/0154458 A1 | 10/2002 | Lin et al. | |
| 2002/0186514 A1 | 12/2002 | Childress et al. | |
| 2003/0011944 A1 | 1/2003 | Hosomi | |
| 2004/0057162 A1 | 3/2004 | Gill | |
| 2004/0218313 A1 | 11/2004 | Suda | |
| 2007/0047146 A1 | 3/2007 | Biskeborn et al. | |
| 2007/0230062 A1 | 10/2007 | Maejima et al. | |
| 2008/0117553 A1 | 5/2008 | Carey et al. | |
| 2008/0151438 A1 | 6/2008 | Tanaka et al. | |
| 2009/0040661 A1 | 2/2009 | Tanaka et al. | |
| 2011/0019313 A1 | 1/2011 | Brown et al. | |
| 2011/0026168 A1 | 2/2011 | Carey et al. | |
| 2011/0051291 A1 | 3/2011 | Miyauchi et al. | |
| 2011/0085261 A1 | 4/2011 | Ito et al. | |
| 2012/0050919 A1 | 3/2012 | Brown et al. | |
| 2012/0063034 A1 | 3/2012 | Hsu et al. | |
| 2014/0022668 A1 | 1/2014 | Takagishi et al. | |
| 2015/0138673 A1 | 5/2015 | Adrong et al. | |
| 2016/0133282 A1 | 5/2016 | Biskeborn et al. | |
| 2017/0309302 A1 | 10/2017 | Biskeborn et al. | |
| 2018/0053522 A1* | 2/2018 | Biskeborn | G11B 5/3909 |
| 2018/0068682 A1 | 3/2018 | Biskeborn et al. | |

OTHER PUBLICATIONS

List of IBM Patents or Patent Applications Treated As Related.
Supplemental Notice of Allowance from U.S. Appl. No. 15/445,861, dated Jan. 31, 2018.
Kim et al., Characterization of an AIO Tunneling Barrier in a Magnetic Tunnel Junction by a Surface Plasmon Resonance Spectroscopy Technique, IEEE Transactions on Magnetics, vol. 45, No. 1, Jan. 2009.
Non-Final Office Action from U.S. Appl. No. 14/534,098, dated Apr. 3, 2015.
Biskeborn et al., U.S. Appl. No. 14/591,861, filed Jan. 7, 2015.
Biskeborn et al., U.S. Appl. No. 14/534,098, filed Nov. 5, 2014.
Non-Final Office Action from U.S. Appl. No. 14/591,861, dated Jul. 28, 2015.
Final Office Action from U.S. Appl. No. 14/534,098, dated Aug. 5, 2015.
Notice of Allowance from U.S. Appl. No. 14/534,098, dated Oct. 15, 2015.
Biskeborn et al., U.S. Appl. No. 14/996,061, filed Jan. 14, 2016.
Biskeborn et al., U.S. Appl. No. 15/136,759, filed Apr. 22, 2016.
Notice of Allowance from U.S. Appl. No. 15/136,759, dated Nov. 18, 2016.
Non-Final Office Action from U.S. Appl. No. 15/422,322, dated Mar. 7, 2017.
Biskeborn et al., U.S. Appl. No. 15/422,322, filed Feb. 1, 2017.
Biskeborn et al., U.S. Appl. No. 15/445,861, filed Feb. 28, 2017.
Final Office Action from U.S. Appl. No. 15/422,322, dated Aug. 3, 2017.
Non-Final Office Action from U.S. Appl. No. 15/445,861, dated Aug. 7, 2017.
Notice of Allowance from U.S. Appl. No. 15/422,322, dated Oct. 4, 2017.
Biskeborn et al., U.S. Appl. No. 15/812,871, filed Nov. 14, 2017.
Notice of Allowance from U.S. Appl. No. 15/445,861, dated Dec. 11, 2017.
Supplemental Notice of Allowance from U.S. Appl. No. 15/445,861, dated Dec. 20, 2017.
Supplemental Notice of Allowance from U.S. Appl. No. 15/422,322, dated Dec. 26, 2017.
Notice of Allowance from U.S. Appl. No. 15/812,871, dated Mar. 5, 2018.
Supplemental Notice of Allowance from U.S. Appl. No. 15/445,861, dated Mar. 14, 2018.

* cited by examiner

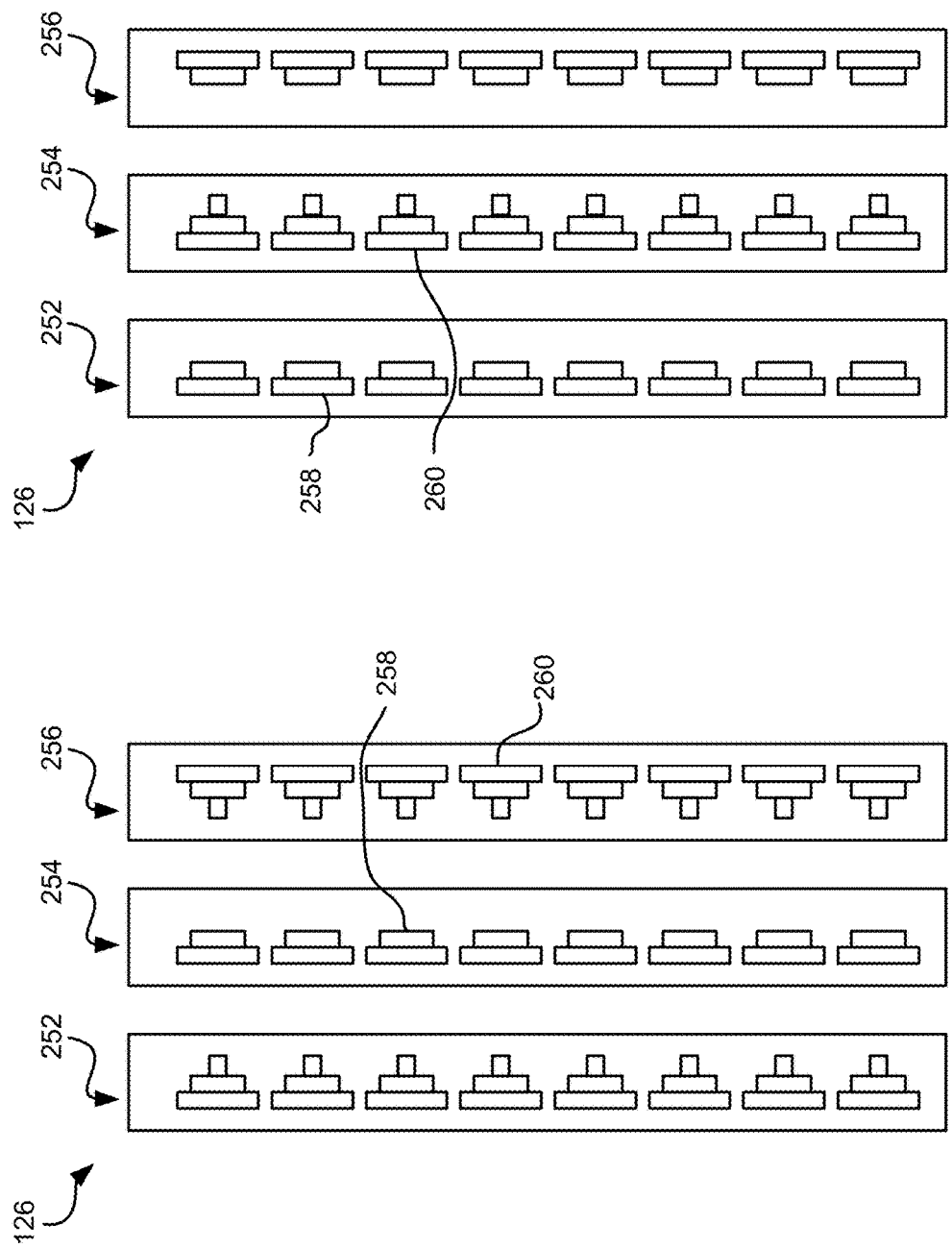

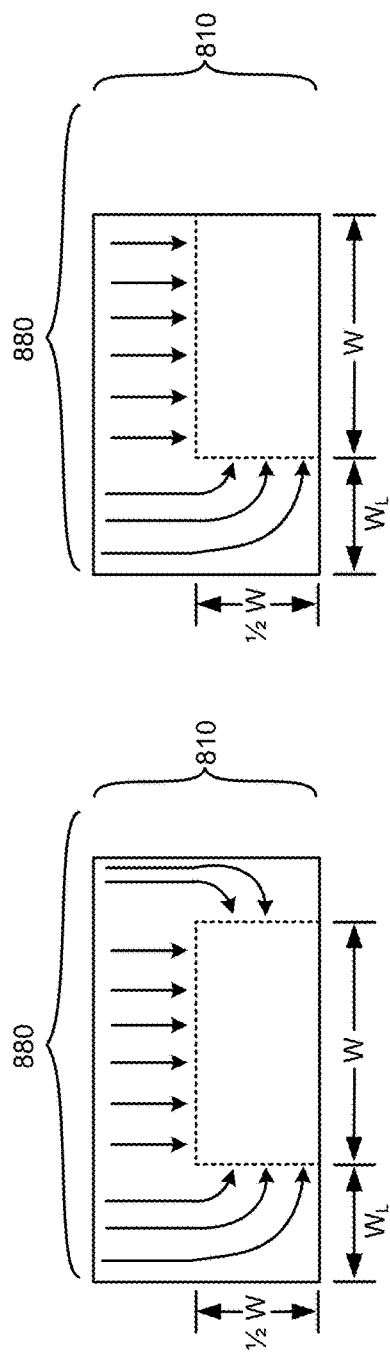
FIG. 11C
FIG. 11D
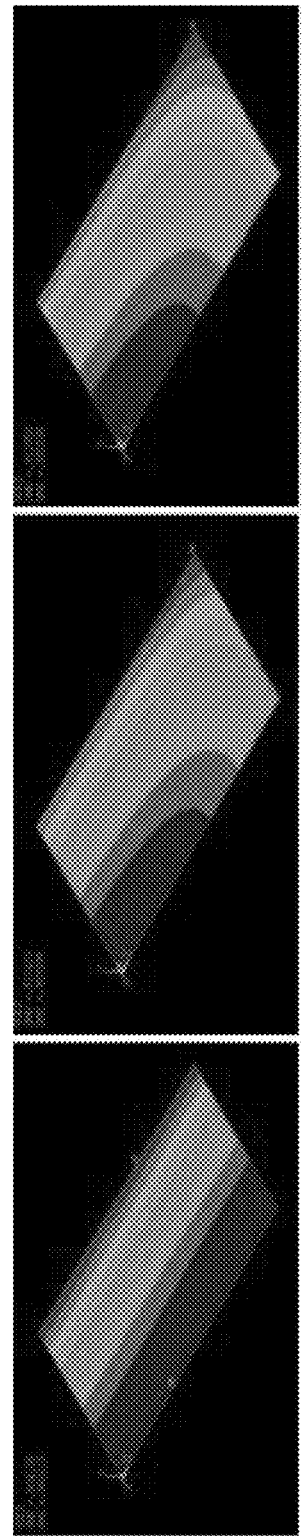
FIG. 12A
FIG. 12B
FIG. 12C

TUNNEL MAGNETORESISTIVE SENSOR HAVING LEADS SUPPORTING THREE DIMENSIONAL CURRENT FLOW

BACKGROUND

The present invention relates to data storage systems, and more particularly, this invention relates to magnetic heads, e.g., magnetic tape heads, which include current-perpendicular-to-plane (CPP) sensors having hard spacers incorporated therewith.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus, according to one embodiment, includes: a transducer structure having: a lower shield, an upper shield above the lower shield, a current-perpendicular-to-plane sensor between the upper and lower shields, an electrical lead layer between the sensor and one of the shields, and a spacer layer between the electrical lead layer and the one of the shields. The upper and lower shields provide magnetic shielding. The electrical lead layer is in electrical communication with the sensor. A conductivity of the electrical lead layer is higher than a conductivity of the spacer layer. A width of the electrical lead layer in a cross-track direction is greater than the width of a free layer of the sensor.

An apparatus, according to another embodiment, includes: a transducer structure having: a lower shield, an upper shield above the lower shield, a current-perpendicular-to-plane sensor between the upper and lower shields, a first electrical lead layer between the sensor and the upper shield, a second electrical lead layer between the sensor and the lower shield, a first spacer layer between the first electrical lead layer and the upper shield, and a second spacer layer between the second electrical lead layer and the lower shield. The upper and lower shields provide magnetic shielding. The first and second electrical lead layers are in electrical communication with the sensor. A width of the second electrical lead layer in a cross-track direction is greater than a width the sensor.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 11C depicts the current flow into a sensor according to one embodiment.

FIG. 11D depicts the current flow into a sensor according to one embodiment.

FIGS. 12A-12C show voltage maps at the surface of the sensor according to various embodiments.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having one or more heads which implement CPP sensors having hard spacers incorporated therewith. Thus, various embodiments described herein may reduce the probability of sensor shorting for CPP sensors, e.g., such as tunneling magnetoresistive (TMR) sensors, giant magnetoresistive (GMR), etc., as will be described in further detail below.

In one general embodiment, an apparatus includes: a transducer structure having: a lower shield, an upper shield above the lower shield, a current-perpendicular-to-plane sensor between the upper and lower shields, an electrical lead layer between the sensor and one of the shields, and a spacer layer between the electrical lead layer and the one of the shields. The upper and lower shields provide magnetic shielding. The electrical lead layer is in electrical communication with the sensor. A conductivity of the electrical lead layer is higher than a conductivity of the spacer layer. A width of the electrical lead layer in a cross-track direction is greater than the width of a free layer of the sensor.

In another general embodiment, an apparatus includes: a transducer structure having: a lower shield, an upper shield above the lower shield, a current-perpendicular-to-plane sensor between the upper and lower shields, a first electrical lead layer between the sensor and the upper shield, a second electrical lead layer between the sensor and the lower shield, a first spacer layer between the first electrical lead layer and the upper shield, and a second spacer layer between the second electrical lead layer and the lower shield. The upper and lower shields provide magnetic shielding. The first and second electrical lead layers are in electrical communication with the sensor. A width of the second electrical lead layer in a cross-track direction is greater than a width the sensor.

Figure 1A:
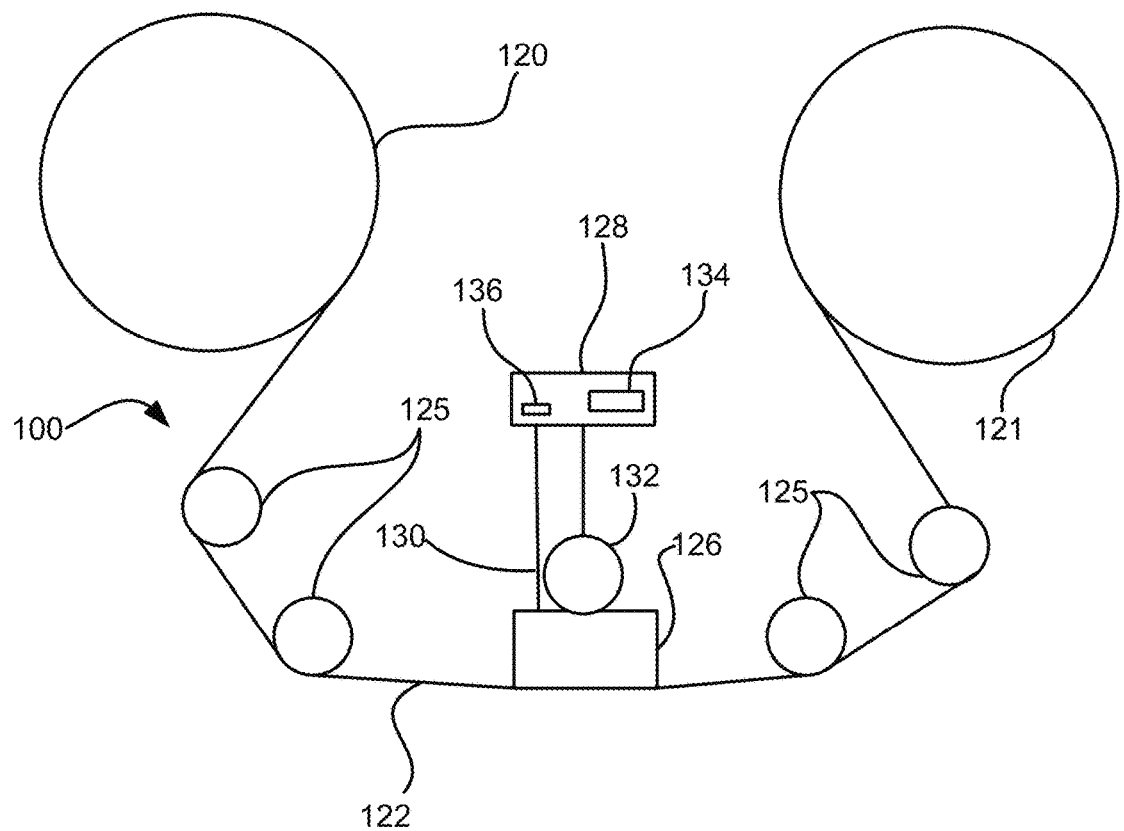
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
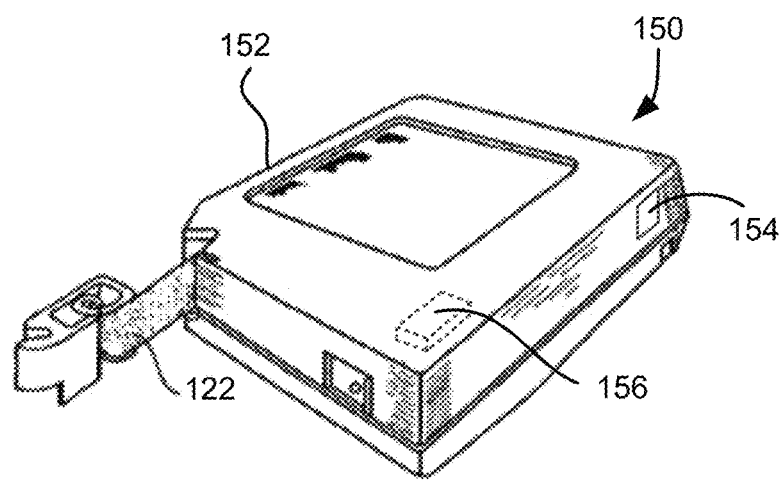
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or other device.

Figure 2:
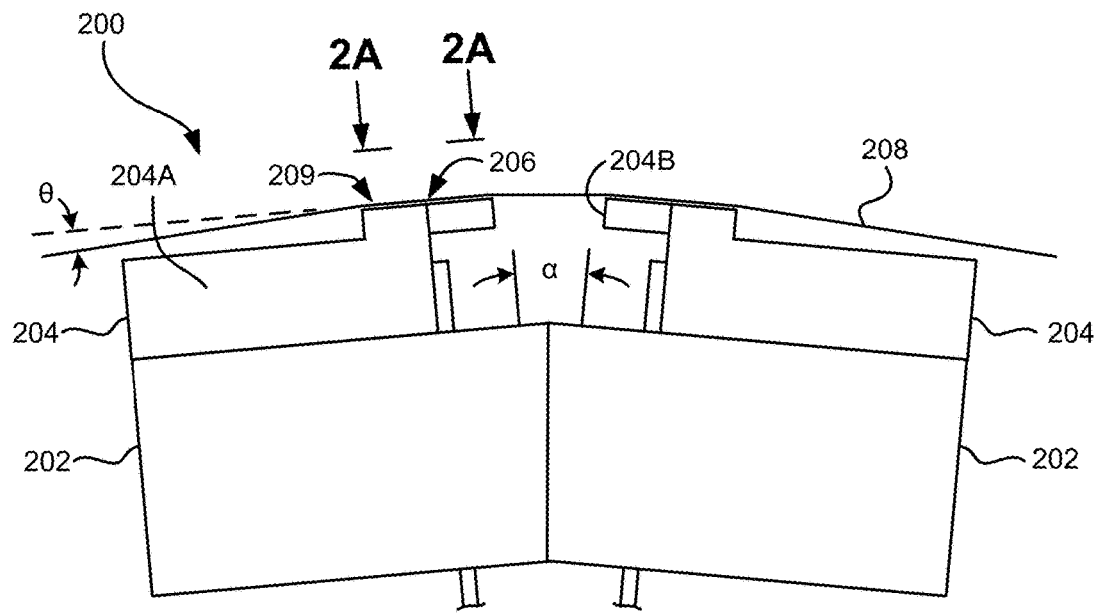
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
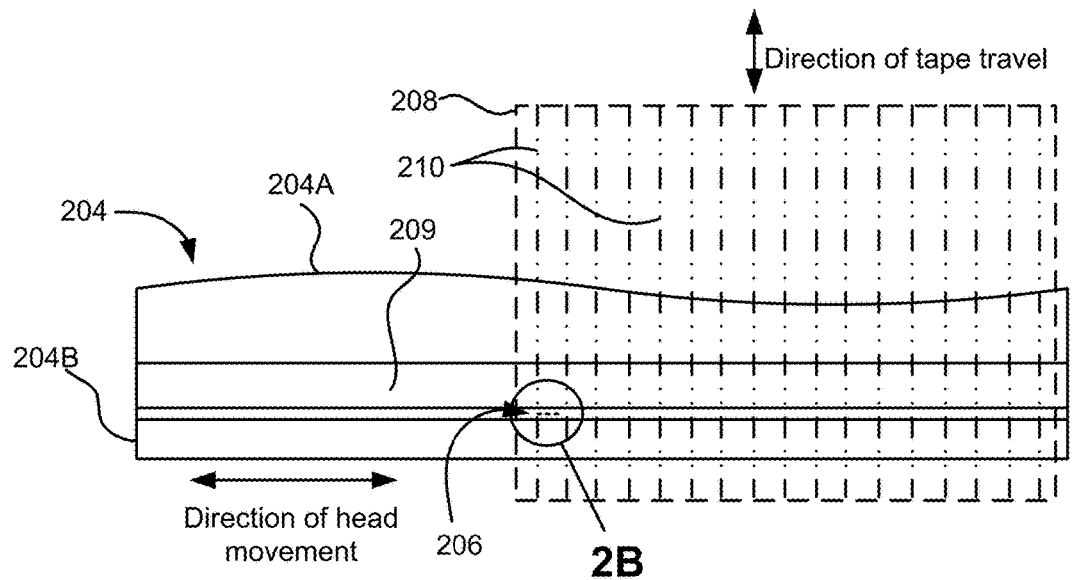
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
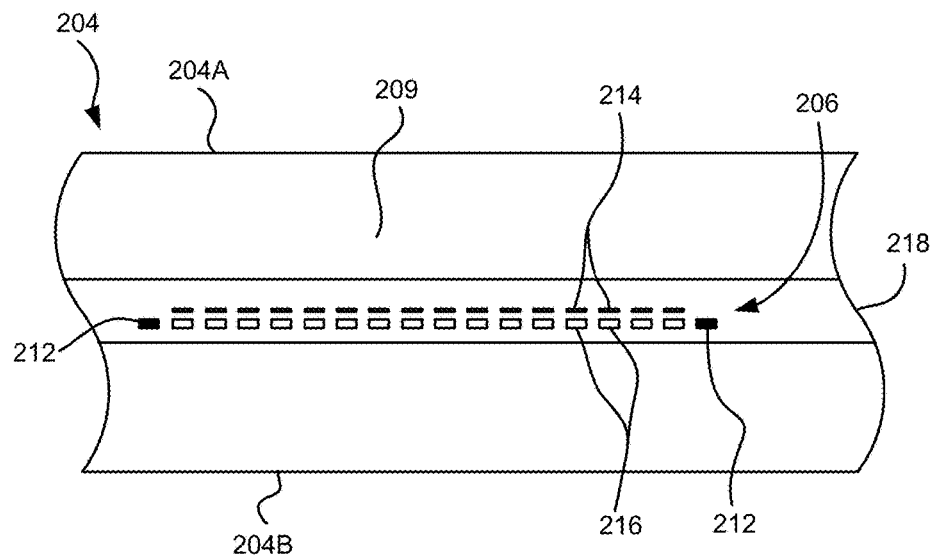
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
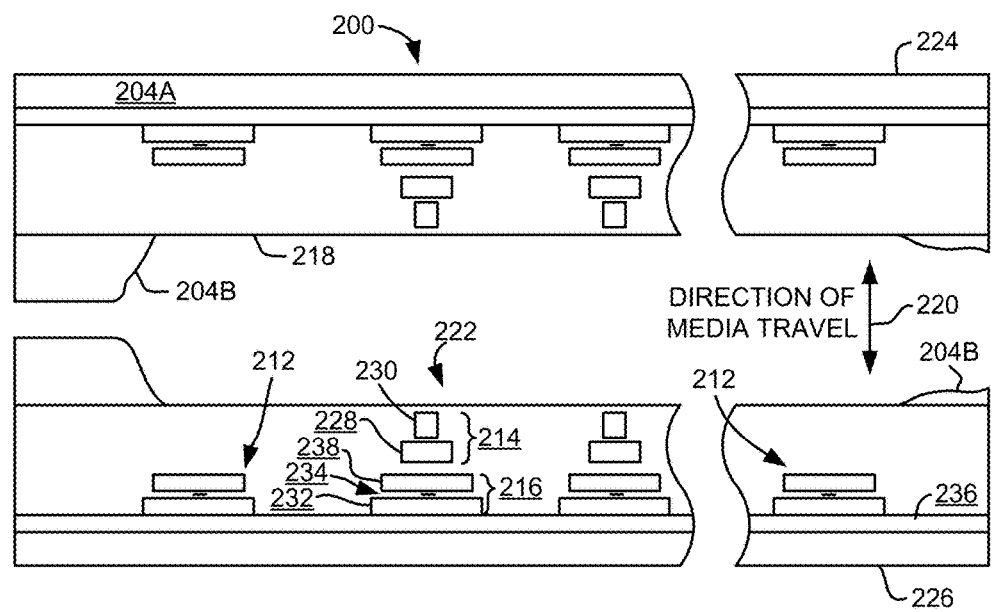
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetorisistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cadmium zinc telluride (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type of CPP sensor, including those based on MR, GMR, TMR, etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
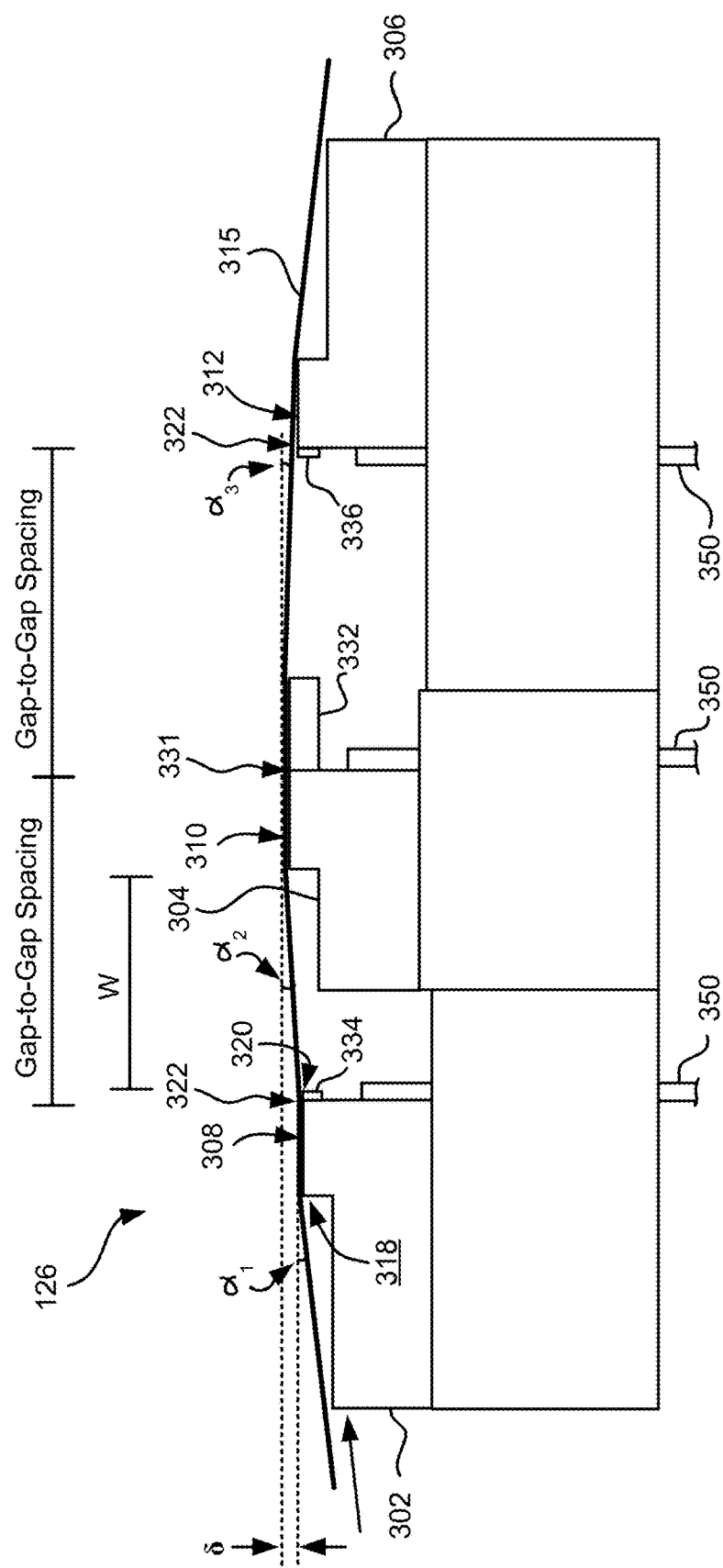
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
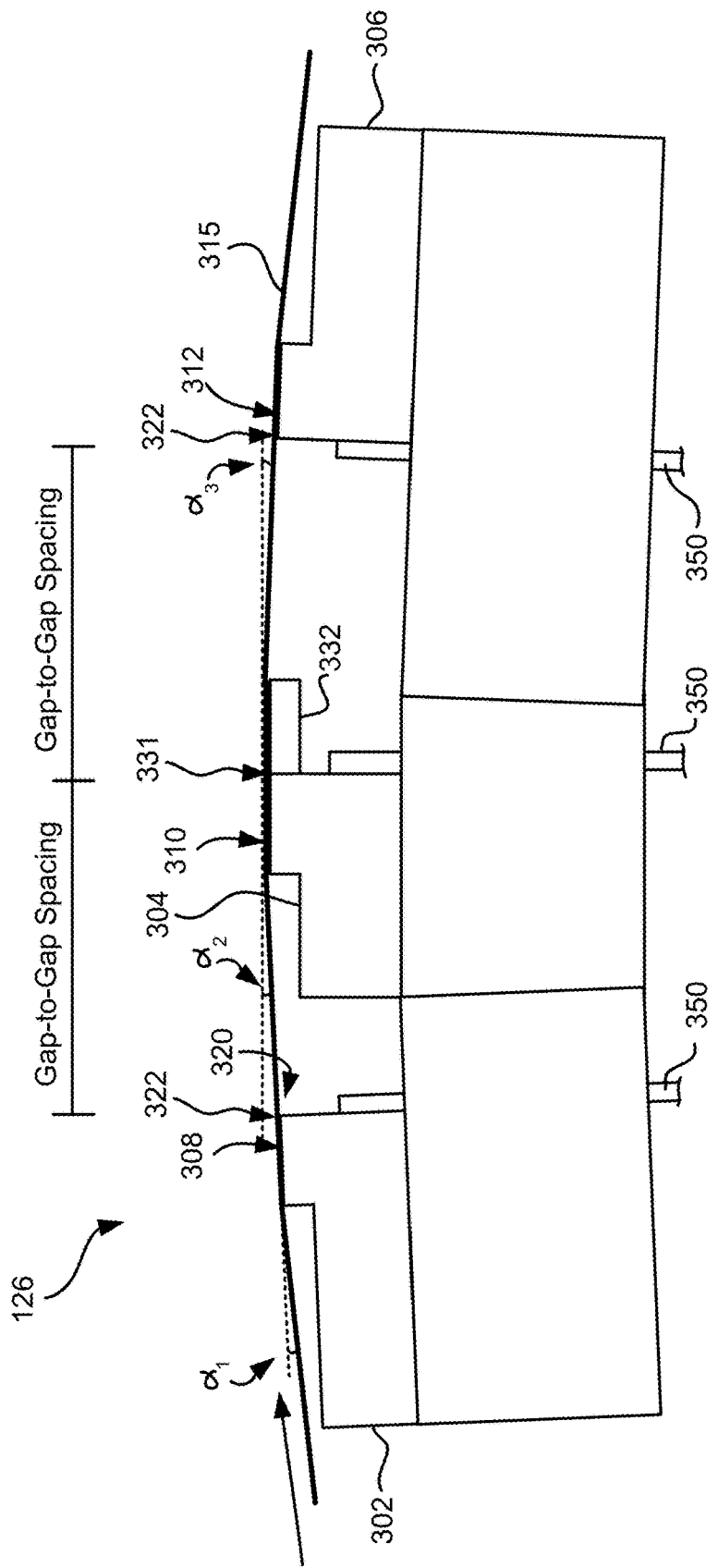
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape-open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
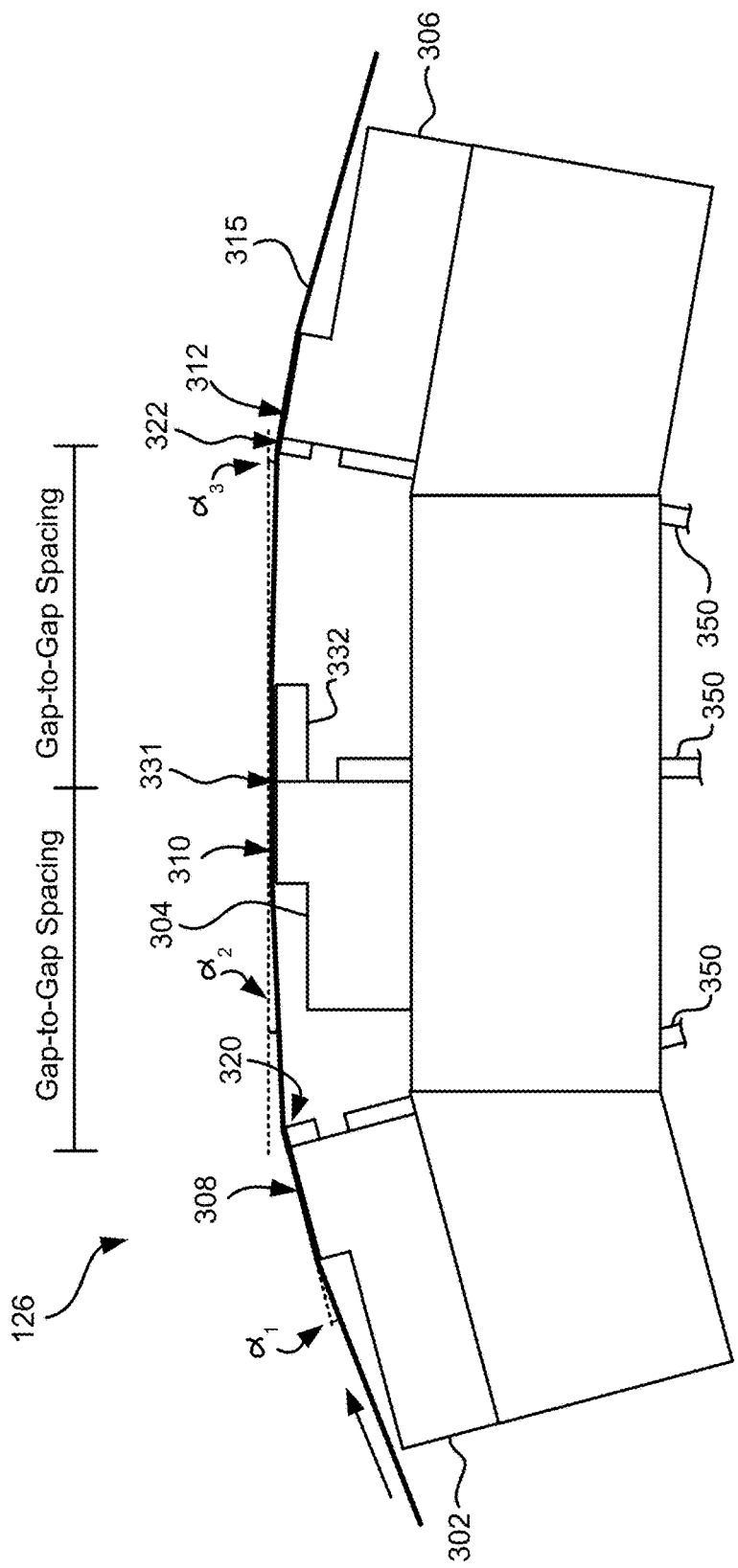
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

With continued reference to the above described apparatuses, it would be advantageous for tape recording heads to include TMR sensor technology. Furthermore, with on-going decrease in data track width in magnetic storage technologies, TMR sensors enable readback of data in ultra-thin data tracks due to their high level of sensitivity in such small operating environments.

As will be appreciated by one skilled in the art, by way of example, TMR is a magnetoresistive effect that occurs with a magnetic tunnel junction. TMR sensors typically include two ferromagnetic layers separated by a thin insulating barrier layer. One layer (the reference layer) has a fixed magnetization while the magnetic moment of the other layer is free to rotate. When the barrier layer is thin enough e.g., less than about 15 angstroms, electrons may tunnel from one ferromagnetic layer to the other ferromagnetic layer, passing through the insulating barrier. Variations in the barrier resistance, caused by the influence of external magnetic fields from a magnetic medium on the free ferromagnetic layer of the TMR sensor, correspond to data stored on the magnetic medium.

In tape recording, friction between asperities on the tape and the ductile metallic films in the sensor gives rise to deformation forces in the direction of tape motion. As a result, an electrical short may be created by the scratching and/or smearing of the ductile layers. This may create bridges of conductive material across the sensor. Particularly, the asperities tend to plow through ductile magnetic material, e.g., from one or both shields, smearing the metal across the insulating material, and thereby creating an electrical short that reduces the effective resistance of the sensor and diminishes the sensitivity of the sensor as a whole. If one or more sensors in a multichannel tape head are rendered non-functional, then tape drive cartridge capacity may be diminished.

Those familiar with TMR sensor technology would expect that a TMR sensor might experience shorting in a contact recording environment such as magnetic tape data storage due to abrasive asperities embedded in the recording medium scraping across the thin insulating layer during tape travel, thereby creating the aforementioned shorting. The inventors have, in fact, observed the tendency of such shorting occurrences.

Typical TMR sensors in hard disk drive applications are configured to be in electrical contact with the top and bottom shields of read head transducers. In such configurations the current flow is constrained to traveling between the top shield and the bottom shield through the sensor, by an insulator layer with a thickness of about 3 to about 100 nanometers (nm) proximate to the sensor stack, and thicker further away. This insulator layer extends below the hard bias magnet layer to insulate the bottom of the hard bias magnet from the bottom shield/lead layers, and isolates the edges of the sensor from the hard bias magnet material. In a tape environment, where the sensor is in contact with the tape media, ductile transport of the bottom shield material and/or the hard bias magnet material may bridge the insulation layer separating the hard bias magnet from the bottom lead and lower shield (bottom lead), thereby shorting the sensor. Further, sensor and/or shield deformation or smearing may create a conductive bridge across a tunnel barrier layer in a TMR sensor. Such tunnel barrier layer may be only 12 angstroms wide or less.

In disk drives, conventional TMR sensor designs are acceptable because there is minimal contact between the head and the media. However, for tape recording, the head and the media are in constant contact. Head coating has been cited as a possible solution to these shorting issues; however tape particles and asperities have been known to scratch through and/or wear away these coating materials as well. Because the tunnel barrier layer of a conventional TMR sensor is extremely thin, there is a propensity for electrical shorting due, e.g., to scratches, material deposits, surface defects, films deformation, etc.

Embodiments described herein implement novel spacer layers in combination with TMR sensors. As a result, some of the embodiments described herein may be able to reduce the impact of shorting in the most common areas where shorting has been observed, e.g. the areas on opposite sides of the sensor between the shields.

The potential use of TMR sensors in tape heads has heretofore been thought to be highly questionable, as tape heads include multiple sensors, e.g., 16, 32, 64, etc., on a single die. If one or more of those sensors becomes inoperable due to the aforementioned shorting, the head as a whole may not be able to function properly and would need to be replaced for proper operation of the apparatus.

Furthermore, tape heads with TMR sensors, a current perpendicular-to-plane sensor, may short with a single event. Thus, TMR sensors are more susceptible to shorting due to scratches than conventional current in-plane type sensors which demonstrate diminished sensor output after at least two shorting events across different parts of the sensor.

TMR sensors comprised of non-conducting, durable films configured to mitigate shorting across the MgO tunnel barrier caused by defects in the moving media may also in turn lower electrical resistance. In conventional tape heads with TMR sensors as described, current flows through thin leads positioned between the sensor stack and non-conducting films. In this design, current density through the tunnel valve barrier may be highest at the end furthest from the media bearing surface. In other words, the region of the sensor having the highest current is the region least influenced by magnetic flux from the medium, thereby resulting in a loss of head output compared to a head having current flowing purely orthogonal to the sensor plane.

Various embodiments described herein include a tunnel valve structure that has non-conducting spacers to buffer the shields from thin electrical lead layers delivering current to the tunnel valve sensor. The embodiments provide a uniform current flow directed across the height of the sensor by implementing an insulating spacer between the shield and the adjacent lead, where the insulating spacer has a perimeter proximate to the sensor periphery, thereby urging current to flow from the shield, around the edges of the spacer to the lead, and through the sensor.

Figure 8A:
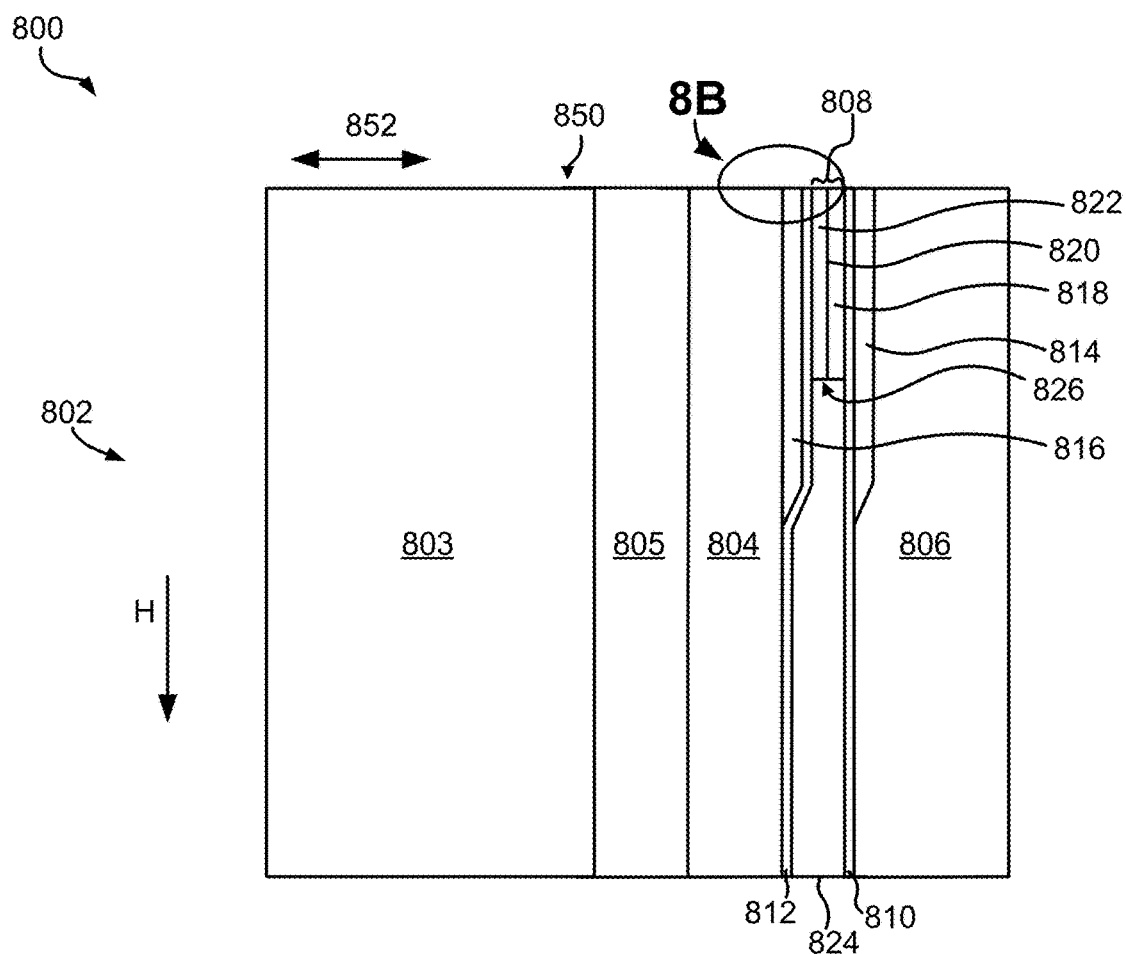
FIG. 8A is a partial cross-sectional view of a transducer structure according to one embodiment.
Figure 8B:
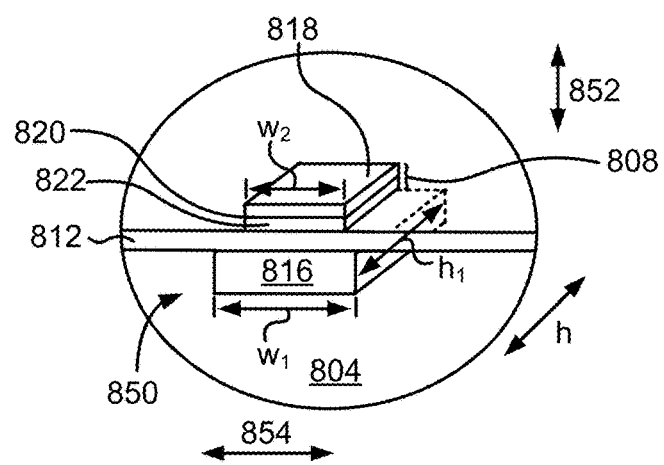
FIG. 8B is a media-facing side perspective view taken from circle 8B in FIG. 8A according to one embodiment.
Figure 8C:
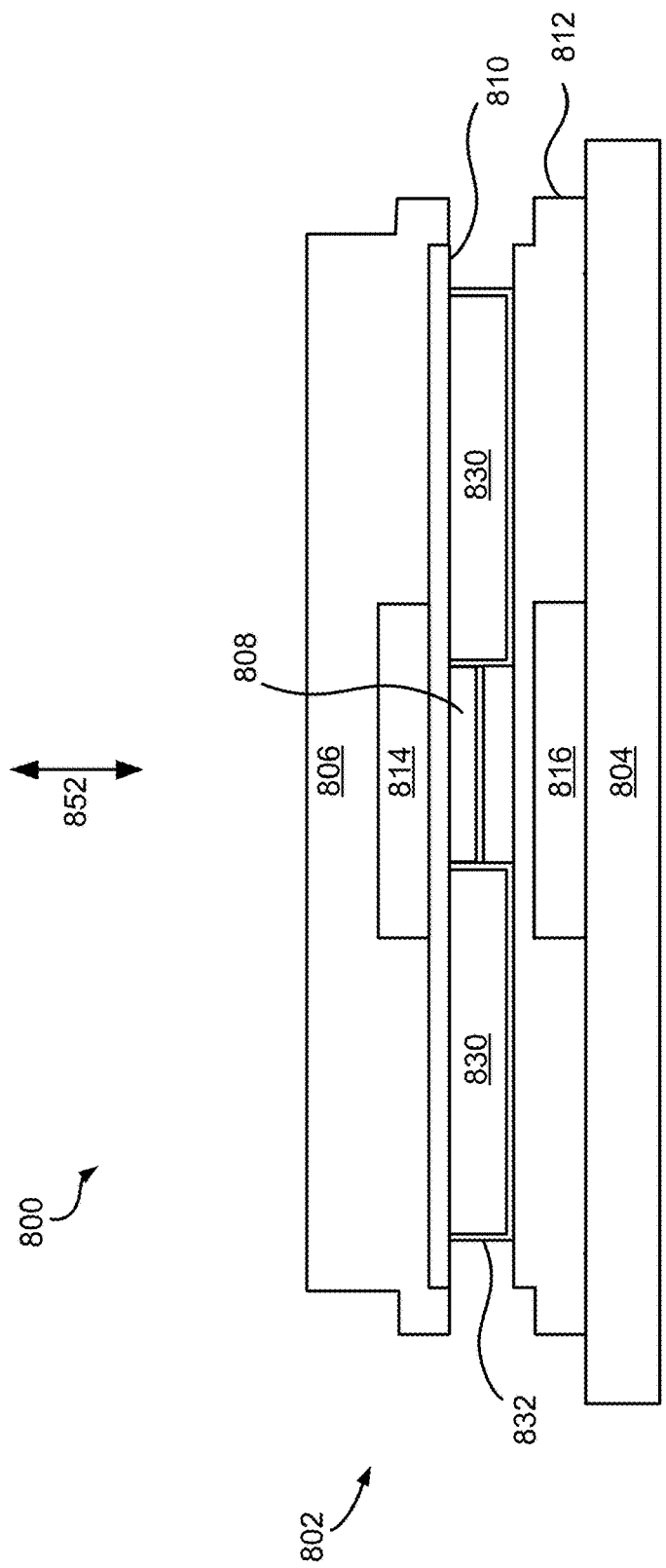
FIG. 8C is a partial side view of a media-facing side of a transducer structure according to one embodiment.

FIGS. 8A-8C depict an apparatus 800, in accordance with one embodiment. As an option, the present apparatus 800 may be implemented in conjunction with features from any other embodiment listed herein, such as those described with reference to the other FIGS. However, such apparatus 800 and others presented herein may be used in various applications and/or in permutations which may or may not be specifically described in the illustrative embodiments listed herein. Further, the apparatus 800 presented herein may be used in any desired environment. Thus FIGS. 8A-8C (and the other FIGS.) may be deemed to include any possible permutation.

Apparatus 800 includes a magnetic read transducer 802. Although FIGS. 8A-8C illustrate only a single magnetic read transducer 802, apparatus 800 may include one or more additional magnetic read transducers on a remainder of a module, e.g., in an array such as in FIGS. 2B-4. Accordingly, the components and/or configurations of magnetic read transducer 802 may be incorporated in any magnetic read transducer described herein.

The magnetic read transducer 802 includes a current-perpendicular-to-plane sensor 808, e.g., a tunnel magnetoresistive (TMR) sensor.

According to some embodiments, the sensor 808 may be configured as a data sensor for reading data tracks of a magnetic medium.

According to other embodiments, the sensor 808 may be configured as a servo pattern reading sensor of a servo reader. For example, the sensor 808 may be configured as a servo pattern reading sensor where apparatus 800 includes one or more arrays of data readers and/or writers and one or more servo track readers for reading servo data on a medium.

Looking to FIG. 8A, apparatus 800 includes a transducer structure 802 which has a lower shield 804 above a wafer 803 and optional undercoat 805. An upper shield 806 is positioned above the lower shield 804 (e.g., in a deposition direction thereof). A CPP sensor 808 (e.g. such as a TMR sensor, GMR sensor, etc.) is positioned between the upper and lower shields 806, 804 in an intended direction 852 of media travel thereacross. As would be appreciated by one skilled in the art, upper and lower shields 806, 804 preferably provide magnetic shielding for the CPP sensor 808. Thus, one or both of the upper and lower shields 806, 804 may desirably include a magnetic material of a type known in the art, such as permalloy or CZT.

Furthermore, as shown in FIG. 8A, the active TMR region of the sensor 808 includes a free layer 818, a tunnel barrier layer 820 and a reference layer 822 e.g., of conventional construction. According to various embodiments, the free layer 818, the tunnel barrier layer 820 and/or the reference layer 822 may include construction parameters, e.g., materials, dimensions, properties, etc., according to any of the embodiments described herein, and/or conventional construction parameters, depending on the desired embodiment. Illustrative materials for the tunnel barrier layer 820 include amorphous and/or crystalline forms of, but are not limited to, TiOx, MgO and $Al_2O_3$.

FIG. 8A further includes a first electrical lead layer 810 positioned between the sensor 808 and the upper shield 806 (e.g., the shield closest thereto). Moreover, a second electrical lead layer 812 is included between the sensor and the lower shield 804 (e.g., the shield closest thereto). The first and second electrical lead layers 810, 812 are preferably in electrical communication with the sensor 808, e.g., to enable an electrical current to pass through the sensor 808.

First and second spacer layers 814, 816 are also included in the transducer structure 802. The spacer layers 814, 816 are dielectric in some approaches, but may be conductive in other approaches. The spacer layers 814, 816 preferably have a very low ductility, e.g., have a high resistance to bending and deformation in general, and ideally a lower ductility than refractory metals such as Ir, Ta, and Ti. First spacer layer 814 is positioned such that it is sandwiched between the first electrical lead layer 810 and the upper shield 806 (e.g., the shield closest thereto) at the media facing side 850. Similarly, the second spacer layer 816 is positioned between the second electrical lead layer 812 and the lower shield 804 (e.g., the shield closest thereto) at the media facing side 850.

In a preferred embodiment, the thin electrical leads 810, 812 extend laterally beyond one or both of the sides of the sensor in the track width direction. Preferably, the width of one or both of the electrical leads 810, 812 is at least 1½ times the width $w_2$ of the free layer 818 at the media facing side, and may preferably be at least the width of the free layer 818 plus 2× the stripe height of the free layer.

Extending the thin electrical lead layers beyond three sides of the sensor may reduce resistance and urge current to travel through the sensor near the media facing side 850 where the magnetic flux from the media is strongest, thereby improving signal output. Furthermore, an apparatus where the edges of an insulating spacer layer are proximate to the edges of the sensor in a cross track direction may provide a sensing structure that is resistant to deformation and shorting and has lower lead resistance to the tunnel valve device. In such a structure, the close proximity of three edges of the spacer to the three edges of the sensor stack may assist current flow into the sensor via all three sides of the sensor thereby increasing density of current flow towards the media facing side.

A schematic of the third dimension of the sensor region showing the cross-track direction 854 is illustrated in FIG. 8B as selected from circle 8B of FIG. 8A. Looking to FIG. 8B, the second spacer layer 816 may be positioned between the lower shield 804 and the second electrical lead layer 812 in the direction 852 of media travel with planes of deposition of all layers extending in a cross-track direction 854. As shown in FIG. 8B, the sensor 808 which includes a reference layer 822, a tunnel barrier region 820, and a free layer 818 may be positioned on the opposite side of the electrical lead layer 812 from the spacer layer 816. In an exemplary embodiment, the width $w_1$ of the spacer layer 816 in a cross-track direction 854 may be as wide as the width $w_2$ of the free layer 818 of the sensor 808. In some approaches, the spacer layer 816 present between the lower shield 804 and the electrical lead layer 812 may have a width $w_1$ in the cross-track direction 854 that may be greater than the width $w_2$ of the sensor 808 at the media facing side.

Referring to FIG. 8A, but not shown in FIG. 8B, one embodiment may have the first spacer 814 positioned on the opposite side of the sensor 808 between the upper shield 806 and a first electrical lead layer 810. The width of the first spacer 814 may have a width in the cross-track direction 854 that may be greater than the width $w_2$ of the free layer 818 of the sensor 808. Moreover, in other approaches, the spacer layer 814 present between the upper shield 806 and the electrical lead layer 810 may have a width in the cross-track direction 854 greater than a width $w_2$ of the sensor 808 at the media facing side thereof.

As shown in FIG. 8B, the thin electrical lead 812 extends laterally beyond the sides of the sensor in the track width direction. Preferably, the width of the electrical lead 812 is at least 1½ times the width $w_2$ of the free layer 818 at the media facing side, and may preferably be at least the width of the free layer 818 plus 2× the stripe height of the free layer.

FIG. 8C shows a top view of an illustrative embodiment of the transducer 802 in which the electrical lead layers 810, 812 may be in electrical communication with the upper and lower shields 806, 804. The edges of the spacer layers 814, 816 may be proximate to the edges of the sensor 808 but separated therefrom by the respective electrical lead layer 810, 812. An insulating layer 832 may at least partially surround the hard bias 830 such that the insulating layer 832 may be positioned between the hard bias 830 and the sensor 808 as well as between the hard bias 830 and the electrical lead layer 810.

With continued reference to FIGS. 8A and 8C, although it is preferred that a spacer layer is included on either side of the sensor 808 along the intended direction 852 of tape travel, some embodiments may include only one spacer layer positioned between one of the leads and the shield closest thereto.

As described above, it is not uncommon for tape asperities passing over the sensor to smear the material of an upper or lower shield onto the opposite shield, thereby potentially shorting the sensor. The close proximity of the spacer layers, which may be non-conducting films, to the sensing structure may resist deformation and thus smearing. Moreover, because the first and second electrical lead layers 810, 812 are separated from the upper and lower shields 806, 804 at media facing side by the first and second spacer layers 814, 816 respectively, the probability of a smear bridging the first and second electrical lead layers 810, 812 at the sensor is reduced.

Thus, as illustrated in FIG. 8A, it is preferred that the first and second spacer layers 814, 816 are positioned at the media facing side 850 of the transducer structure 802, e.g., such that the sensor 808 and/or electrical lead layers 810, 812 are separated from the upper and lower shields 806, 804 thereby reducing the chance of a shorting event occurring.

In an illustrative embodiment shown in FIG. 8A, the spacer layer 816 may be present between the lower shield 804 and the electrical lead layer 812, where the spacer layer 816 may extend beyond a back edge 826 of the sensor 808 in an element height H direction. In another embodiment, the spacer layer 814 may be present between the upper shield 806 and the electrical lead layer 810, wherein the spacer layer 814 may extend beyond a back edge 826 of the sensor 808 in an element height H direction.

Moreover, it is preferred that the material composition of the first and second spacer layers 814, 816 is sufficiently resistant to smearing and/or plowing of conductive material across the sensor 808. Thus, the first and second spacer layers 814, 816 are preferably hard, e.g., at least hard enough to prevent asperities in the tape passing over the transducer structure 802 from causing deformations in the media facing side 850 of the transducer structure 802 which affect the performance of the sensor 808. In preferred embodiments, the first and/or second spacer layers 814, 816 include aluminum oxide. However, according to various embodiments, the first and/or second spacer layers 814, 816 may include at least one of aluminum oxide, chrome oxide, silicon nitride, boron nitride, silicon carbide, silicon oxide, titanium oxide, ceramics, titanium nitride, zirconium nitride, etc., and/or combinations thereof. In an exemplary embodiment, the spacer layers 814, 816 may preferably include silicon nitride.

Without wishing to be bound by any theory, it is believed that the improved performance experienced by implementing aluminum oxide spacer layers 814, 816 may be due to the low ductility of alumina, relatively high hardness, and low friction resulting between the aluminum oxide spacer layers and defects (e.g., asperities) on a magnetic tape being passed thereover. This is particularly apparent when compared to the higher resistance experienced when metal films and/or coating films are implemented. Specifically, coatings on the media facing side may not be effective in preventing shorting because underlying films (e.g., such as permalloy) are still susceptible to indentation, smearing, plowing, deformation, etc.

Thus, in an exemplary approach, the first and/or second spacer layers may include an aluminum oxide which may preferably be amorphous. Moreover, an amorphous aluminum oxide spacer layer may be formed using sputtering, atomic layer deposition, etc., or other processes which would be appreciated by one skilled in the art upon reading the present description. According to another exemplary approach, the first and/or second spacer layers may include an at least partially polycrystalline aluminum oxide.

Furthermore, in various embodiments, the first and/or second electrical lead layers 810, 812 may include any suitable conductive material, e.g., which may include Ir, Ru, Pt, NiCr, Ta, Cr, etc.; a sandwiched structure of Ta (e.g. Ta/X/Ta); conductive hard alloys such as titanium nitride, boron nitride, silicon carbide, and the like.

Although first and second spacer layers 814, 816 separate first and second electrical lead layers 810, 812 from the upper and lower shields 806, 804 at the media facing side 850 of the transducer structure 802, the first and/or second electrical lead layers 810, 812 are preferably still in electrical communication with the shields closest thereto.

However, it should be noted that the embodiment illustrated in FIGS. 8A-8C is in no way intended to limit the invention. Although the electrical lead layers 810, 812 depicted in FIG. 8A are electrically connected to upper and lower shields 806, 804 respectively, in other embodiments, one or both of the electrical lead layers 810, 812 may not be electrically connected to the respective shields. According to one example, the first and second electrical lead layers may be stitched leads, e.g., see FIG. 15, rather than each of the lead layers 810, 812 having a single lead layer as seen in FIG. 8A. Thus, neither of the first or second electrical lead layers may be in electrical communication with the shields according to some embodiments, as will be described in further detail below.

The electrically conductive layer(s) may have a higher conductivity than the spacer layer. Thus, the spacer layer in some embodiments may be electrically insulating or a poor conductor. In further approaches, the product of the spacer layer thickness multiplied by the conductivity of the spacer layer may be less than a product of the electrical lead layer thickness multiplied by the conductivity of the electrical lead layer associated with the spacer layer, e.g., positioned on the same side of the sensor therewith.

Figure 9:
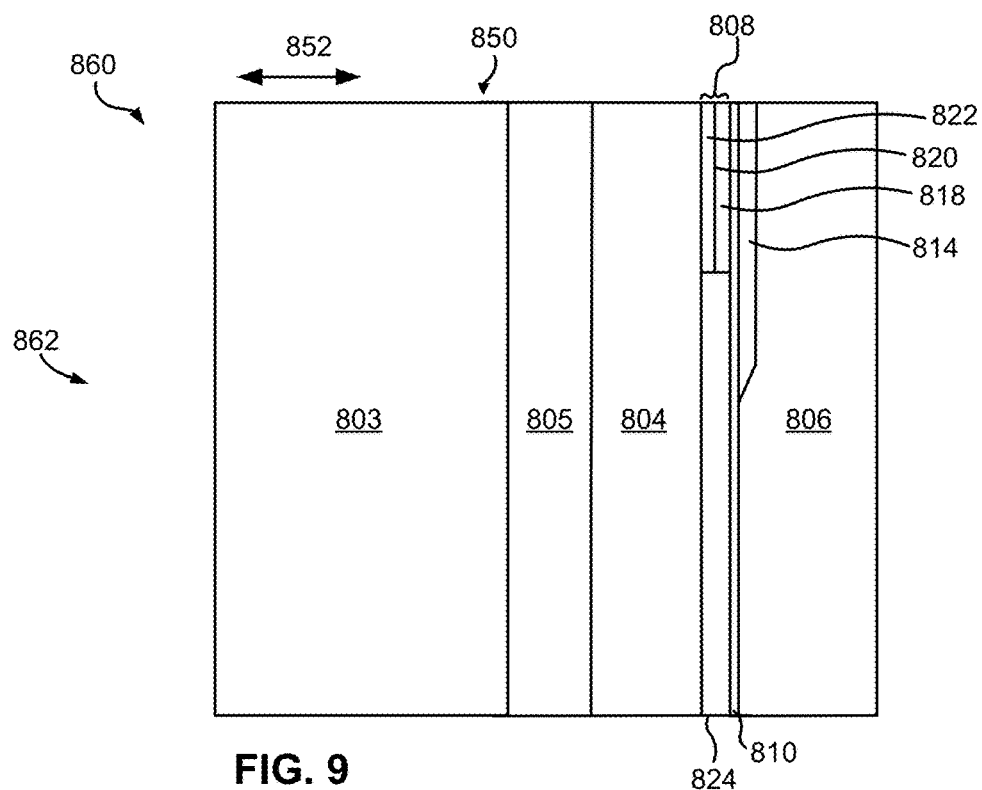
FIG. 9 is a partial cross-sectional view of a transducer structure according to one embodiment
Figure 10:
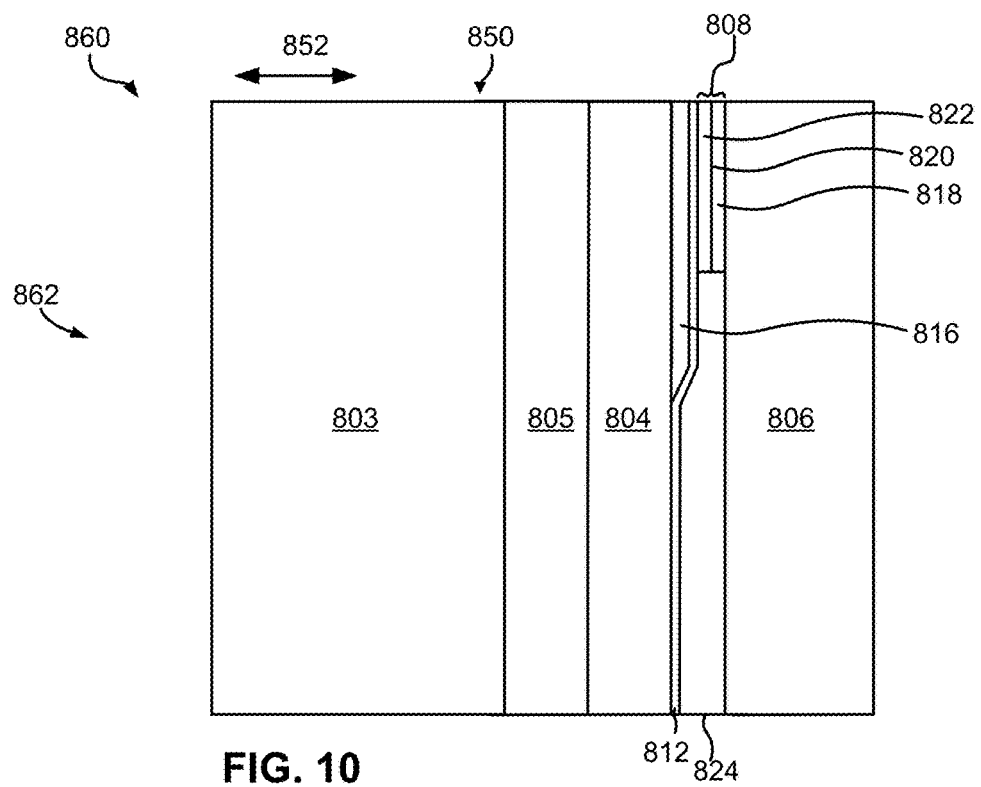
FIG. 10 is a partial cross-sectional view of a transducer structure according to one embodiment

FIGS. 9-10 depict an apparatus 860, in accordance with one embodiment. As an option, the present apparatus 860 may be implemented in conjunction with features from any other embodiment listed herein, such as those described with reference to the other FIGS. However, such apparatus 860 and others presented herein may be used in various applications and/or in permutations which may or may not be specifically described in the illustrative embodiments listed herein. Further, the apparatus 860 presented herein may be used in any desired environment. Thus FIGS. 9-10 (and the other FIGS.) may be deemed to include any possible permutation.

In FIGS. 9-10, only a single spacer layer is present according to one embodiment. In one approach shown in FIG. 9, the spacer layer 814 is between the sensor 808 and the upper shield 806 and one electrical lead layer 810 between the spacer layer 814 and the sensor 808 at the media facing side 850. An insulating spacer or electrical lead layer is not present between the sensor 808 and the lower shield 804. According to this embodiment, the charge current may travel from the upper shield 806 along the electrical lead layer 810 into the sensor 808, and then may flow out to the lower shield 804, or vice versa.

In another approach, as shown in FIG. 10, a spacer layer 816 is between the sensor 808 and the lower shield 804 and one electrical lead layer 812 is between the spacer layer 816 and the sensor 808 at the media facing side 850. In this approach, no spacer or electrical lead layer is present between the sensor 808 and the upper shield 806. According to this embodiment, the charge current may travel from the lower shield 804 along the electrical lead layer 812 into the sensor 808, and then may flow out to the upper shield 806, or vice versa.

Figure 11A:
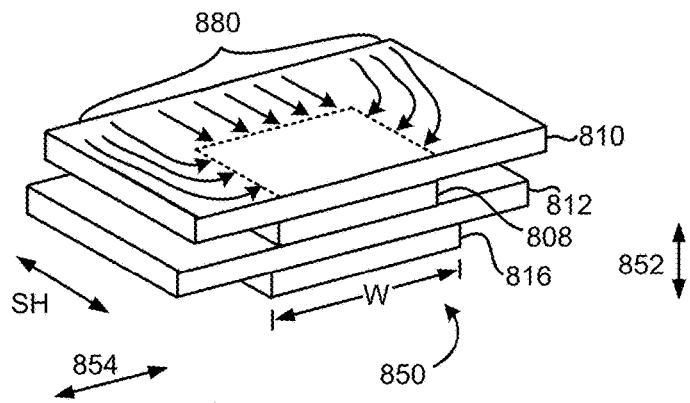
FIG. 11A is a partial perspective view of a media facing side of a transducer structure in the cross track direction according to one embodiment.
Figure 11B:
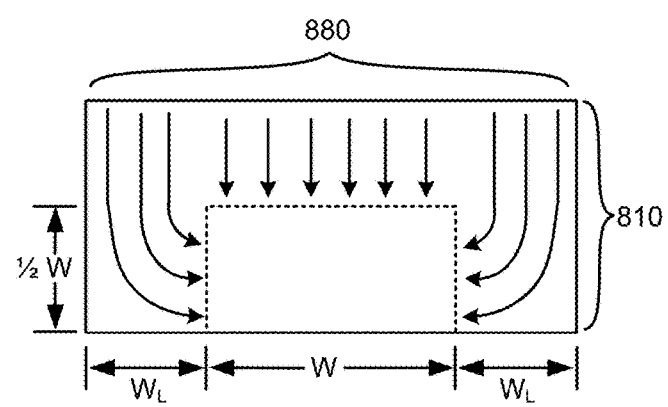
FIG. 11B depicts the current flow into the sensor of FIG. 11A according to one embodiment.

FIGS. 11A-11D show the current flow through the sensor according to two different embodiments. According to one embodiment, FIG. 11A shows the current 880 (black arrows) flowing in the electrical lead layer 810 toward the back and sides of the sensor 808. The insulating spacer 816 below the wider electrical lead layer 812 is proximate to the perimeter of the sensor 808. Furthermore, FIG. 11B shows the current 880 (black arrows) flowing toward the rear of the sensor periphery (represented by dashed lines) where the edges of the insulating spacer 816 may be proximate to the edges of the sensor 808 as shown in FIG. 11A. In a preferred embodiment, the stripe height SH of the sensor is about one half the width W of the sensor 808. See FIGS. 11A and 11B. Moreover, a width $W_L$ of each extension of the electrical lead layer 810 beyond the lateral side of the sensor in the cross-track direction is preferably at least about ½ W.

Extensions of the electrical lead layer 810 positioned beyond the lateral sides of the sensor in the cross-track direction may be asymmetrical, e.g., having different widths $W_L$, on only one side of the sensor, etc. FIGS. 11C and 11D illustrate other embodiments in which the extensions of the electrical lead layer 810 beyond the lateral sides of the sensor in the cross-track direction are asymmetrical.

Adding laterally-located lead portions relative to the free layer of the sensor 808 may improve performance of the free layer. In sensor layers not having laterally-located lead portions, there may be up to about a 20% difference in the voltage drop (or loss) across the sensor at the media facing side 850 compared to the voltage drop across the area near the back edge of the sensor farthest from the media facing side 850. However, adding laterally-located lead portions to the sensor layer to increase current flow may reduce the aforementioned 20% difference in the voltage drop by a factor of about 1.5 or more.

FIGS. 12A-C show exemplary voltage maps of the surface of a sensor in three different cases. FIG. 12A shows the voltage map of a surface of a sensor with no laterally-located lead portions. FIGS. 12B and 12C are modeled voltage maps of one half a surface of a sensor with symmetrical laterally-located lead portions and a surface of the sensor with laterally-located lead portions and the hard bias (see FIG. 8C), respectively. FIG. 12C illustrates that there is a small improvement in the current flow distribution due to the parallel path for current provided by the hard bias, which is in communication with the top lead. The two voltage maps with the laterally-located lead portions, as well as the portion located at end of the sensor furthest from the media facing surface show the voltage lines curving around to reflect the current flowing from the side, and hence an increased uniformity of current density over the surface area of the sensor.

Although the operating voltage may be increased in some approaches to partially compensate for loss of output due to voltage drop along the length of the sensor layer, it should be noted that the operating voltage is preferably not increased to a value above a threshold value. The threshold value for the operating voltage of a given approach may be predetermined, calculated in real time, be set in response to a request, etc. According to an exemplary approach, the threshold value for the operating voltage may be determined using the breakdown voltage(s) of the transducer structure layers, e.g., based on their material composition, dimensions, etc.

Looking back to FIG. 8A, in some embodiments, differences in resistivity may also be used to minimize the voltage drop along the length of the sensor layer 808. In order to ensure that sufficient current passes through the sensor layer 808 near the media facing side 850, it is preferred that the resistance of the sensor layer 808, as for example due to tunnel barrier resistivity in a TMR, is high relative to the resistance of the electrical lead layers 810, 812. By creating a difference in the relative resistance of the adjacent layers, voltage drop may desirably be reduced along the height of the sensor layer 808.

This relative difference in resistance values may be achieved by forming the sensor layer 808 such that it has a relatively high barrier resistivity, while the electrical lead layers 810, 812 may have a higher thickness, thereby resulting in a lower resistance value. However, it should be noted that the thickness of the electrical lead layers 810, 812 is preferably greater than about 2 nm. The thin film resistivity of a given material typically increases as the dimensions of the material decreases. As will be appreciated by one skilled in the art upon reading the present description, the resistivity of a material having significantly small dimensions may actually be higher than for the same material having larger dimensions, e.g., due to electron surface scattering. Moreover, as the thickness of the electrical lead layers 810, 812 decreases, the resistance thereof increases. Accordingly, the thickness of the first and/or second electrical lead layers 810, 812 is preferably between about 2 nm and about 20 nm, more preferably between about 5 nm and about 15 nm, but may be higher or lower depending on the desired embodiment, e.g., depending on the material composition of the first and/or second electrical lead layers 810, 812. Moreover, the thicknesses (in the deposition direction) of the first and/or second spacer layers 814, 816 are preferably between about 5 nm and about 50 nm, but may be higher or lower depending on the desired embodiment. For example, spacer layers having a relatively hard material composition may be thinner than spacer layers having a material composition which is less hard. The magnetic spacing between the shields is typically adjusted for proper readback at a given operating point. This may constrain the allowed thickness range available for leads and spacers.

Figure 13:
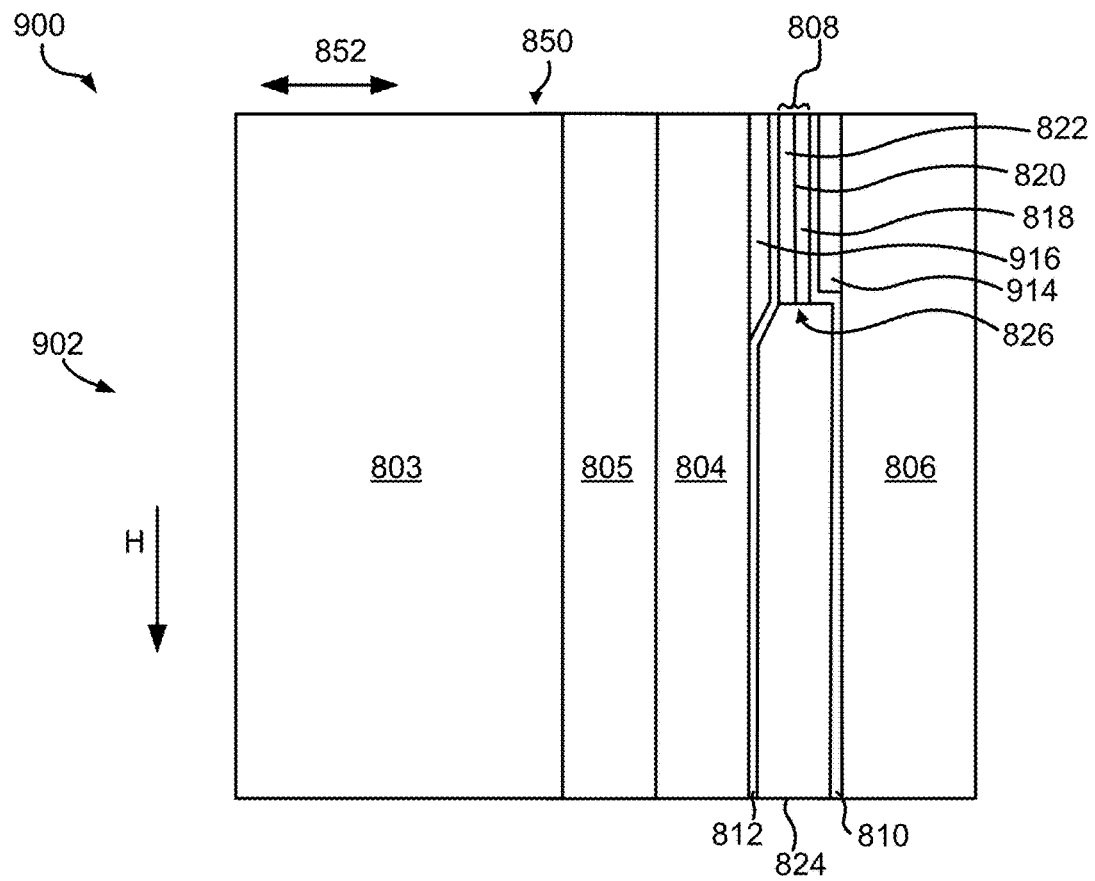
FIG. 13 is a partial cross-sectional view of a transducer structure according to one embodiment.

Looking to FIG. 13, apparatus 900 depicts a transducer structure 902 in accordance with one embodiment. As an option, the present apparatus 900 may be implemented in conjunction with features from any other embodiment listed herein, such as those described with reference to the other FIGS. Specifically, FIG. 13 illustrates variations of the embodiment of FIG. 8A depicting several exemplary configurations within the transducer structure 902. Accordingly, various components of FIG. 13 have common numbering with those of FIG. 8A.

However, such apparatus 900 and others presented herein may be used in various applications and/or in permutations which may or may not be specifically described in the illustrative embodiments listed herein. Further, the apparatus 900 presented herein may be used in any desired environment. Thus FIG. 13 (and the other FIGS.) may be deemed to include any possible permutation.

Looking to FIG. 13, apparatus 900 includes a transducer structure 902 having spacer layers 914, 916 sandwiched between shields 806, 804 and electrical lead layers 810, 812 respectively at the media facing side 850. One embodiment may include a spacer layer 916 between the lower shield 804 and the electrical lead layer 812, where the spacer layer 916 may not extend beyond a back edge 826 of the sensor 808 in an element height H direction. Moreover, the conductivity of the electrical lead layer 812 may be higher than the conductivity of the spacer layer 916.

As an option, a spacer layer 914 may be present between the upper shield 806 and the electrical lead layer 810, where the spacer layer 914 may not extend to a back edge 826 of the sensor 808 in an element height H direction. Looking to FIG. 8B for reference, in a preferred embodiment of the transducer 902, the width of the spacer layer 916 in a cross-track direction 854 may be greater than the width $w_2$ of the free layer 818 of the sensor 808.

A spacer layer may be formed full film, after which a via may be created, e.g., using masking and milling, and filling the via with the stud material, e.g., using atomic layer deposition (ALD), after which the stud may optionally be planarized. Moreover, as shown in FIG. 13, it should be noted that insulating layer 824 may be thicker than sensor 808, thereby causing first electrical lead layer 810 and first spacer layer 914 to extend in the intended tape travel direction 852 before continuing beyond the back edge 826 of the sensor 808 farthest from the media facing side 850, e.g., as a result of manufacturing limitations, as would be appreciated by one skilled in the art upon reading the present description.

The spacer layers 914, 916 may provide protection against smearing at the media facing side 850 while also allowing for the shields 806, 804 to be in electrical communication with the electrical lead layers 810, 812. It follows that one or both of the shields 806, 804 may serve as electrical connections for the transducer structure 902. According to the present embodiment, the shields 806, 804 function as the leads for the transducer structure 902. Moreover, the current which flows towards the media facing side 850 tends to generate a magnetic field which is canceled out by the magnetic field created by the current which flows away from the media facing side 850.

Figure 14:
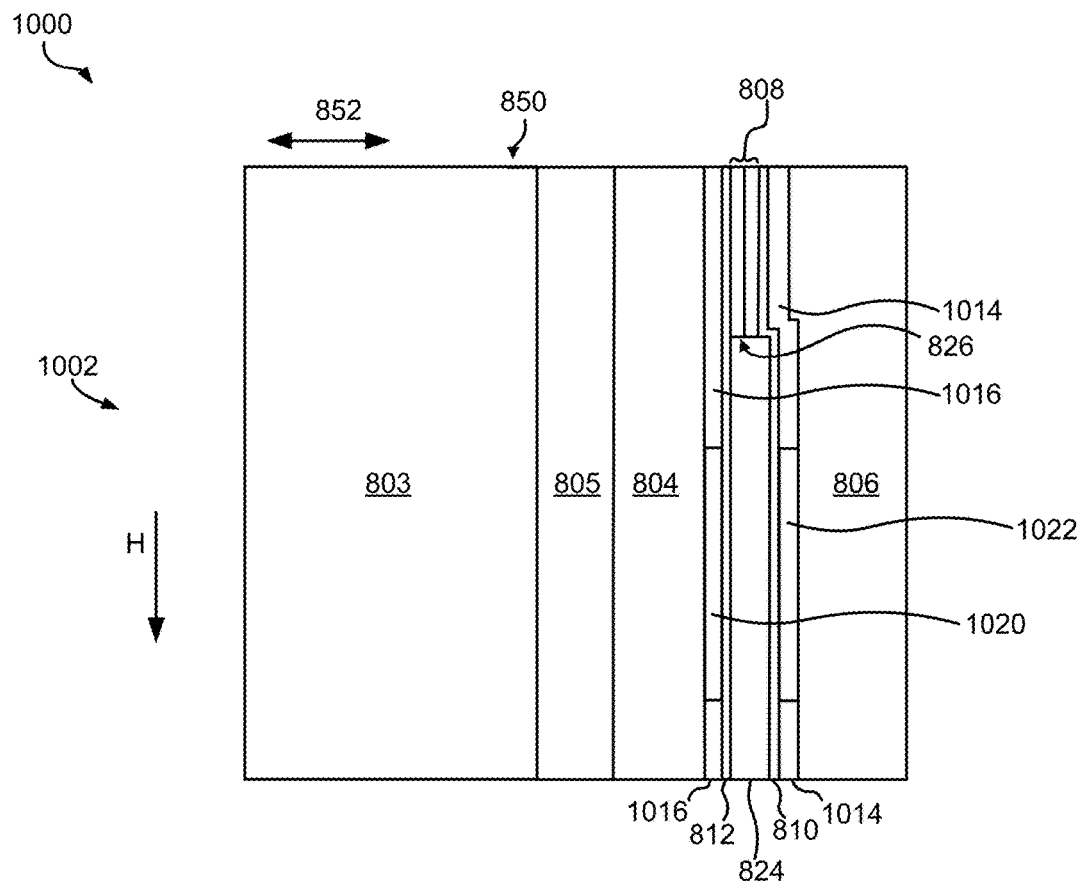
FIG. 14 is a partial cross-sectional view of a transducer structure according to one embodiment.

Looking to FIG. 14, apparatus 1000 depicts a transducer structure 1002 in accordance with one embodiment. As an option, the present apparatus 1000 may be implemented in conjunction with features from any other embodiment listed herein, such as those described with reference to the other FIGS. Specifically, FIG. 14 illustrates variations of the embodiment of FIG. 8A depicting several exemplary configurations within the transducer structure 1002. Accordingly, various components of FIG. 14 have common numbering with those of FIG. 8A.

However, such apparatus 1000 and others presented herein may be used in various applications and/or in permutations which may or may not be specifically described in the illustrative embodiments listed herein. Further, the apparatus 1000 presented herein may be used in any desired environment. Thus FIG. 14 (and the other FIGS.) may be deemed to include any possible permutation.

The electrical lead layers 810, 812 may or may not be in direct electrical communication with the associated shield. Looking to FIG. 14, in embodiments of the transducer structure 1002 where the spacer layers 1014, 1016 are insulative, various mechanisms for providing current to the sensor may be implemented. First and second electrical lead layers 810, 812 are in electrical communication with the upper and lower shields 806, 804 respectively, by implementing studs 1022, 1020 at a location recessed from the media facing side 850. Furthermore, looking to FIG. 8B for reference, in a preferred embodiment of the transducer 1002, the width of the spacer layer 1016 in a cross-track direction 854 may be greater than the width $w_2$ of the free layer 818 of the sensor 808. In some approaches, lateral sides of each lead layer 810, 812 flanking the sensor in the cross track direction may be in direct electrical contact with the shield closest thereto. In other approaches, the studs may wrap around the sides of the spacers to provide current flow between each shield and the associated lead layer.

Studs 1022, 1020 preferably have about the same thickness as first and second spacer layers 1014, 1016 respectively. Moreover, studs 1022, 1020 are preferably positioned behind or extend past an end of the sensor layer 808 which is farthest from the media facing side 850.

Figure 15A:
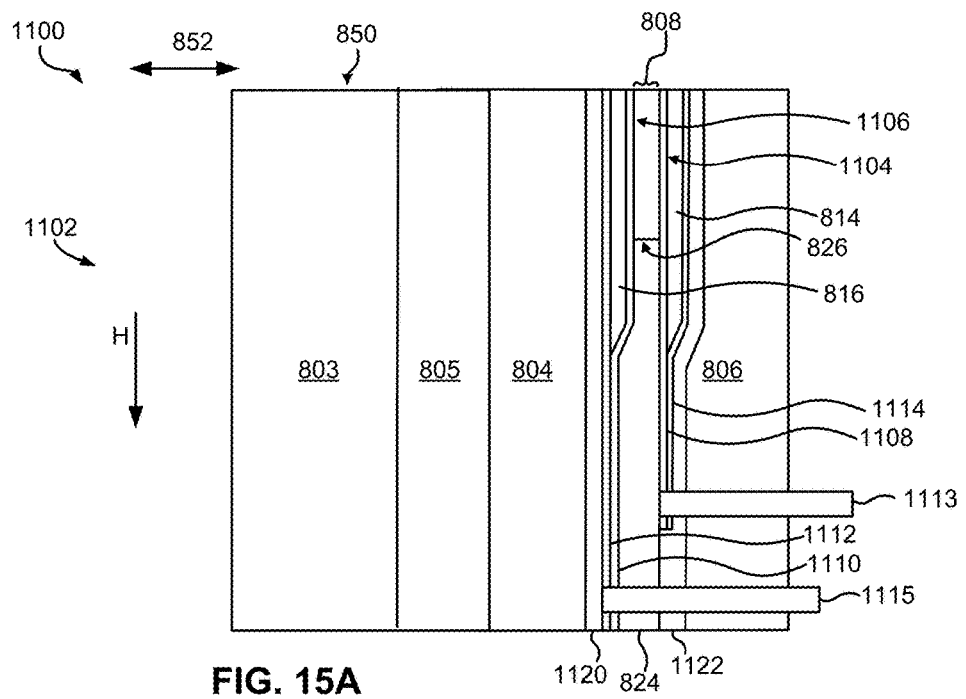
FIG. 15A is a partial cross-sectional view of a transducer structure according to one embodiment.
Figure 15B:
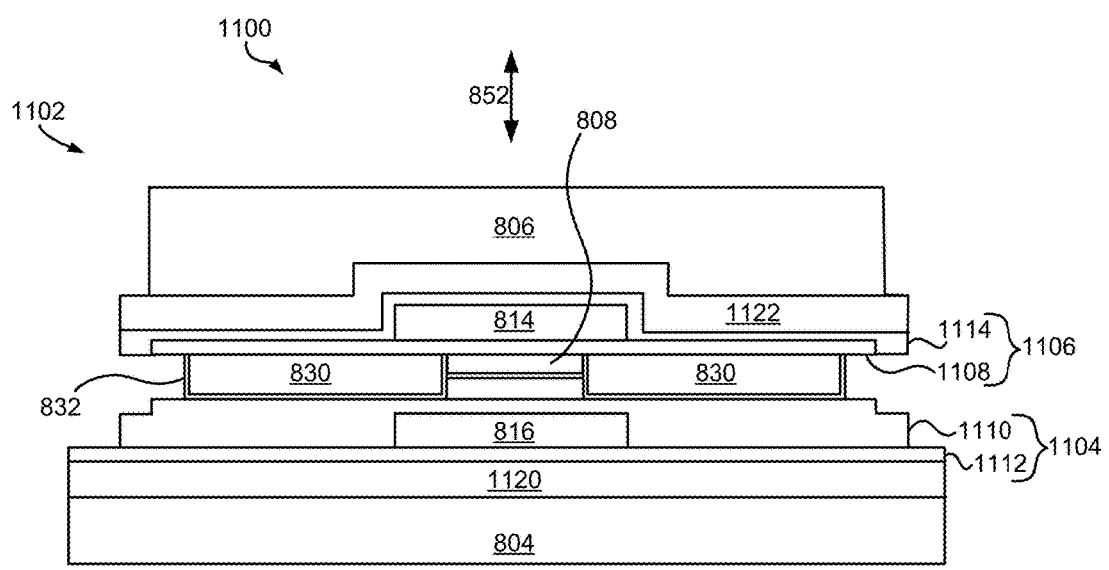
FIG. 15B is a partial side view of a media-facing side of a transducer structure according to one embodiment.

Referring to FIGS. 15A and 15B, apparatus 1100 depicts a transducer structure 1102 in accordance with one embodiment. As an option, the present apparatus 1100 may be implemented in conjunction with features from any other embodiment listed herein, such as those described with reference to the other FIGS. Specifically, FIGS. 15A-15B illustrates variations of the embodiment of FIG. 8A depicting several exemplary configurations within the transducer structure 1102. Accordingly, various components of FIGS. 15A-15B have common numbering with those of FIG. 8A.

However, such apparatus 1100 and others presented herein may be used in various applications and/or in permutations which may or may not be specifically described in the illustrative embodiments listed herein. Further, the apparatus 1100 presented herein may be used in any desired environment. Thus FIGS. 15A-15B (and the other FIGS.) may be deemed to include any possible permutation.

As shown in FIG. 15A, apparatus 1100 includes a transducer structure 1102 having spacer layers 814, 816 sandwiched between shields 806, 804 and electrical lead layers 1104, 1106 respectively. At least one of the first and second electrical lead layers may be a stitched lead. According to the present embodiment, which is in no way intended to limit the invention, both electrical lead layers 1104, 1106 are stitched leads which include a main layer 1108, 1110 and a preferably thicker stitch layer 1114, 1112 thereon, respectively. Vias 1113, 1115 may be coupled to a respective electrical lead layer 1104, 1106. The main layers 1108, 1110 may be made during formation of the transducer structure 1102, while stitch layers 1112, 1114 may be drilled and backfilled after formation of the transducer structure 1102 using processes and/or in a direction which would be apparent to one skilled in the art upon reading the present description.

As shown, the stitch layers 1112, 1114 may be recessed from a media facing side of the main layer 1108, 1110, e.g., the side closest to the media facing side 850. By stitching a second layer of lead material, e.g. the stitch layer 1112, 1114, which is preferably recessed beyond a back edge 826 of the sensor 808 in the height direction H, the resistance associated with the electrical lead layers 1104, 1106 may desirably be reduced, e.g., relative to routing either of the leads past a back edge of the respective shield. As shown in FIG. 15A, the upper and lower shields 806, 804 are insulated from the electrical lead layers 1104, 1106 by insulative spacer layers 1120, 1122.

In various embodiments, the main layers 1108, 1110 and/or a stitch layers 1112, 1114 of either of the stitched electrical lead layers 1104, 1106 may be constructed of any suitable conductive material, e.g., which may include Ir, Ru, Pt, NiCr, Ta, Cr, etc.; a laminated structure of Ta (e.g. Ta/X/Ta); etc.

Looking to FIG. 8B for reference, in a preferred embodiment of the transducer 1102, the width of the spacer layers 816, 814 in a cross-track direction 854 may be greater than the width $w_2$ of the free layer 818 of the sensor 808.

FIG. 15B shows a partial side view of an illustrative embodiment of the transducer 1102 in which the electrical lead layers 1104, 1106 may not be in electrical communication with the upper and lower shields 806, 804 as shown by an insulating spacer layer 1122 between the electrical lead layer 1106 and the upper shield 806, and the insulating spacer layer 1120 between the electrical lead layer 1104 and the lower shield 804. FIG. 15B shows the electrical lead layers 1104, 1106 in the partial side view in which the stitched leads include a main layer 1108, 1110 and a preferably thicker stitch layer 1114, 1112 thereon, respectively. The edges of the spacer layers 814, 816 may be proximate to the edges of the sensor 808 but separated therefrom by the respective electrical lead layer 1104. 1106. An insulating layer 832 may at least partially surround the hard bias 830 such that the insulating layer 832 may be positioned between the hard bias 830 and the sensor 808 as well as between the hard bias 830 and the electrical lead main layer 1110.

According to some approaches, the at least one of the upper and lower shields 806, 804 not having a current (e.g., a read sense current) passing therethrough may be coupled to a bias voltage source. In other words, at least one of the upper and lower shields 806, 804 may be coupled to a bias voltage source. According to other approaches, one or both of the shields may be coupled to an electrical connection (e.g., a lead), but may not carry any current therethrough.

As mentioned above and looking back to FIGS. 15A-15B, the stitched electrical lead layer configuration implemented in transducer structure 1102 desirably reduces the resistance associated with the routing either of the leads beyond a back edge of the respective shield. For example, in an embodiment where Ru is used as the top lead material, the resistivity "ρ" would be about 7.1 micro-ohms/cm. A single lead with thickness of 30 nm would have a sheet resistivity (p/thickness) equal to about 2.3 ohms/square. This implies that if the top lead design had 6 "squares" of lead geometry, the lead resistance would be about 13.8 ohms. However, by implementing a stitched layer above the main layer of the stitched electrical lead layer, the total lead resistance would be significantly reduced. For example, consider a stitched lead of Ru with a thickness of 45 nm covering 5 of the 6 "squares" of the lead geometry. The lead region where the stitched structure and the initial lead overlay has a net thickness of about 75 nm and a sheet resistivity equal to 0.95 ohms/square. Implementing a stitched electrical lead layer as described above would reduce the lead resistance to 7.3 ohms or by about 45%. Embodiments described herein may or may not implement the stitched electrical lead layers 1104, 1106, depending on the preferred embodiment.

In still further approaches, one or more of the electrical lead layers may be an extension of a layer itself, or a separately-deposited material. Establishing an electrical connection to a magnetic lamination proximate to the sensor may create a configuration in which portions of the magnetic shields of an apparatus are not biased or current-carrying. In such embodiments, the electrical lead layers included between the sensor structure and the magnetic shield may serve as an electrical lead. Moreover, at least one of the upper and lower shields 806, 804 may be a floating shield, and thereby may not be biased or current-carrying.

Various embodiments described herein are able to provide bi-directional protection for CPP transducers against shorting which may otherwise result from passing magnetic media over such transducers. Implementing a spacer layer having a high resistivity to smearing and/or plowing between the CPP transducer layer and each of the conducting lead portions of the transducer stack without hindering the flow of current through the sensor enables the embodiments herein to maintain desirable performance over time.

Moreover, as previously mentioned, although it is preferred that an spacer layer is included on either side of a sensor along the intended direction of tape travel, some of the embodiments described herein may only include one spacer layer positioned between one of the leads or sensor and the shield closest thereto, such that the at least one lead is electrically isolated from the shield closest thereto.

Various embodiments may be fabricated using known manufacturing techniques. Conventional materials may be used for the various layers unless otherwise specifically foreclosed. Furthermore, as described above, deposition thicknesses, configurations, etc. may vary depending on the embodiment.

It should be noted that although FIGS. 8A-8C, 9-10, 13, 14, and 15 each illustrate a single transducer structure (transducer structures 802, 862, 902, 1002, 1102), various embodiments described herein include at least eight of the transducer structures above a common substrate, e.g., as shown in FIG. 2B. Furthermore, the number of transducer structures in a given array may vary depending on the preferred embodiment.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a transducer structure having:
        a lower shield;
        an upper shield above the lower shield, the upper and lower shields providing magnetic shielding;
        a current-perpendicular-to-plane sensor between the upper and lower shields;
        an electrical lead layer between the sensor and the lower shield, wherein the electrical lead layer is in electrical communication with the sensor and the lower shield; and
        a spacer layer between the electrical lead layer and the lower shield,
        wherein a conductivity of the electrical lead layer is higher than a conductivity of the spacer layer,
        wherein a width of the electrical lead layer in a cross-track direction is greater than the width of a free layer of the sensor.

2. An apparatus as recited in claim 1, wherein the spacer layer includes at least one of: aluminum oxide, chrome oxide, silicon nitride, boron nitride, silicon carbide, silicon oxide, titanium oxide, and titanium nitride.

3. An apparatus as recited in claim 2, wherein the spacer layer includes silicon nitride.

4. An apparatus as recited in claim 2, wherein the spacer layer includes aluminum oxide.

5. An apparatus as recited in claim 1, wherein the electrical lead layer includes a main layer and a stitch layer thereon, the stitch layer being recessed from a media facing side of the main layer.

6. An apparatus as recited in claim 1, wherein the spacer layer is electrically insulating.

7. An apparatus as recited in claim 1, wherein the sensor is a tunneling magnetoresistive sensor.

8. An apparatus as recited in claim 1, wherein a width of the spacer layer in a cross-track direction is greater than the width of a free layer of the sensor.

9. An apparatus as recited in claim 1, wherein the electrical lead layer extends beyond a back edge of the sensor in an element height direction.

10. An apparatus as recited in claim 1, comprising:
    a drive mechanism for passing a magnetic medium over the sensor; and
    a controller electrically coupled to the sensor.

11. An apparatus, comprising:
    a transducer structure having:
        a lower shield;
        an upper shield above the lower shield, the upper and lower shields providing magnetic shielding;
        a current-perpendicular-to-plane sensor between the upper and lower shields;
        a first electrical lead layer between the sensor and the upper shield;
        a second electrical lead layer between the sensor and the lower shield;
        a first spacer layer between the first electrical lead layer and the upper shield; and
        a second spacer layer between the second electrical lead layer and the lower shield,
        wherein the first and second electrical lead layers are in electrical communication with the sensor,
        wherein a width of the second electrical lead layer in a cross-track direction is greater than a width of the sensor,
        wherein the first electrical lead layer is in electrical communication with the upper shield.

12. An apparatus as recited in claim 11, wherein the second electrical lead layer extends beyond a back edge of the sensor in an element height direction.

13. An apparatus as recited in claim 11, wherein the width of the first electrical lead layer in the cross-track direction is greater than a width of a free layer of the sensor.

14. An apparatus as recited in claim 11, wherein at least one of the spacer layers is electrically insulating.

15. An apparatus as recited in claim 11, wherein the second electrical lead layer is in electrical communication with the lower shield.

* * * * *